(12) United States Patent
Fan et al.

(10) Patent No.: US 12,065,577 B2
(45) Date of Patent: Aug. 20, 2024

(54) WOOD ARTICLE AND PROCESS FOR THE PREPARATION OF THE WOOD ARTICLE

(71) Applicant: GUANGDONG HUARUN PAINTS CO., LTD, Foshan (CN)

(72) Inventors: Shigang Fan, Foshan (CN); Xi Zhao, Foshan (CN); Gang Duan, Cleveland, OH (US)

(73) Assignee: GUANGDONG HUARUN PAINTS CO., LTD, Foshan (CN)

( * ) Notice: Subject to any disclaimer, the term of this patent is extended or adjusted under 35 U.S.C. 154(b) by 412 days.

(21) Appl. No.: 17/424,233

(22) PCT Filed: Jan. 14, 2020

(86) PCT No.: PCT/CN2020/071957
§ 371 (c)(1),
(2) Date: Jul. 20, 2021

(87) PCT Pub. No.: WO2020/156145
PCT Pub. Date: Aug. 6, 2020

(65) Prior Publication Data
US 2022/0025202 A1 Jan. 27, 2022

(30) Foreign Application Priority Data

Jan. 29, 2019 (CN) .......................... 201910085770.3

(51) Int. Cl.
| | | |
|---|---|---|
| *C09D 15/00* | (2006.01) | |
| *B05D 7/06* | (2006.01) | |
| *C09D 4/00* | (2006.01) | |
| *C09D 5/00* | (2006.01) | |
| *C09D 131/04* | (2006.01) | |
| *C09D 133/04* | (2006.01) | |
| *C09D 135/00* | (2006.01) | |
| *C09D 175/14* | (2006.01) | |

(52) U.S. Cl.
CPC .............. *C09D 15/00* (2013.01); *C09D 4/00* (2013.01); *C09D 5/002* (2013.01); *C09D 131/04* (2013.01); *C09D 133/04* (2013.01); *C09D 135/00* (2013.01); *C09D 175/14* (2013.01); *B05D 7/06* (2013.01)

(58) Field of Classification Search
None
See application file for complete search history.

(56) References Cited

U.S. PATENT DOCUMENTS

| | | | |
|---|---|---|---|
| 5,084,536 A | 1/1992 | Brindoepke et al. | |
| 5,565,525 A | 10/1996 | Morimoto et al. | |
| 10,920,101 B2 * | 2/2021 | Brinkhuis | B05D 3/067 |
| 2005/0245636 A1 | 11/2005 | Fechter et al. | |

FOREIGN PATENT DOCUMENTS

| | | |
|---|---|---|
| CN | 101006103 | 7/2007 |
| CN | 101115571 | 1/2008 |
| CN | 101712174 | 5/2010 |
| CN | 102115630 | 7/2011 |
| CN | 105694644 | 6/2016 |
| CN | 107660227 | 2/2018 |
| CN | 107660228 | 2/2018 |
| CN | 107667151 | 2/2018 |
| CN | 108485510 | 9/2018 |
| CN | 109877025 | 6/2019 |
| EP | 0326723 | 8/1989 |
| EP | 2556108 | 7/2014 |
| EP | 2764035 | 12/2016 |
| EP | 3623433 A1 | 3/2020 |
| EP | 3967733 A1 | 3/2022 |
| WO | 2014166880 | 10/2014 |
| WO | 2016166361 A1 | 10/2016 |
| WO | 2019145472 A1 | 8/2019 |

OTHER PUBLICATIONS

International Search Report & Written Opinion for patent appl. No. PCT/CN2020/071957, dated Apr. 2, 2020 (18 pages, including English translation).
Office Action for Vietnamese patent application No. 1-2021-04561, dated Sep. 30, 2021 (2 pages, including English translation).
Office Action for Chinese patent application No. 2019100857703, dated Feb. 2, 2021 (9 pages, including English summary of substantive portion of Office Action).
Office Action for Chinese patent application No. 2019100857703, dated Nov. 22, 2021 (9 pages, including English summary of substantive portion of Office Action).
Extended European Search Report for European Patent Application No. 20748014.6, dated Sep. 20, 2022, 8 pages.
Allnex "ACURE(TM) 510-170 technical datasheet", May 29, 2020 (May 29, 2020), pp. 1-1, XP055960587.
Brinkhuis, et al. "Taming the Michael Addition Reaction" European Coatings Journal, May 2015, 7 pages.

* cited by examiner

*Primary Examiner* — Sheeba Ahmed

(57) ABSTRACT

The present disclosure relates to a wood article and a process for preparing the wood article. In particular, the present disclosure relates to a wood article comprising a wood substrate comprising acidic substances and having at least one major surface; a sealing coating applied on the major surface of the wood substrate; and a Michael Addition curing coating applied on the sealing coating, wherein the sealing coating is formed by a sealing agent comprising one or more chosen from an aqueous latex of polyurethane acrylics polymer, an aqueous latex of carboxyl functional self-crosslinkable acrylics polymer, an aqueous latex of cationic acrylics polymer, an aqueous latex of polyvinyl acetate and a two-component polyurethane coating system; and wherein the Michael Addition curing coating is formed from a two-component curable coating composition.

12 Claims, No Drawings

WOOD ARTICLE AND PROCESS FOR THE PREPARATION OF THE WOOD ARTICLE

CROSS REFERENCE TO RELATED APPLICATION

The present application is the National Stage filing under 35 U.S.C. 371 of International Application No. PCT/CN2020/071957 filed Jan. 14, 2020, which itself claims priority to Chinese Patent Application No. 201910085770.3 entitled "wood article and process for the preparation of the wood article" and filed on Jan. 29, 2019, which is incorporated herein by reference in its entirety.

TECHNICAL FIELD

The present disclosure relates to a wood article containing a Michael Addition curing coating. More specifically, the present disclosure relates to the use of a particular sealing coating for improving the adhesion of the Michael Addition curing coating to a wood substrate comprising acidic substances, and to the resulting wood articles having a Michael Addition curing coating assisted by the sealing coating.

BACKGROUND

Wooden articles including wood furniture, which are the most commonly used product in production and life, are mainly made of wood substrates. It is well known that wood substrates have special textures, natural color and the like that are unmatched by other materials. However, the wooden substrate inevitably has the characteristics of complex structure, uneven material, porous, swelling and shrinking when exposed to water, and containing undesirable substances such as grease, tannins and other colored impurities, which is not an ideal industrial material. Therefore, the research on wood lacquers that can provide a protective layer for wooden substrates has attracted particular attention.

The Michael addition curing coating system with low volatile organic compounds (VOC) has received special attention in recent years, which is expected to replace two-component polyurethane (PU) curing coatings in the fields of ships, aerospace, construction, and metal profiles. Particularly attractive is that this coating system has many attractive advantages, including: (1) capable of curing at ambient temperatures, even lower temperature; (2) very low solvent content such as VOC<250 g/l; (3) very long pot-life such as a pot life of >8 hours at 23° C.; (4) excellent appearance such as gloss @60° of >90 and DOI>90; (5) excellent mechanical properties (including excellent chemical resistance, excellent scratch resistance, excellent flexibility, good outdoor resistance, and the like), and (6) free of harmful chemicals such as isocyanate, formaldehyde and organtin and the like. Thus, there has been a strong demand for this Michael Addition curing system in market. However, the application of this system on wood substrates is not satisfactory. So far, there is no wood article coated with this low-VOC Michael addition curing coating system on the market.

Therefore, there is a need in industry for wood articles coated with this low-VOC Michael addition curing coating system.

SUMMARY

In one aspect, the present disclosure discloses a wood article comprising: a wood substrate comprising acidic substances and having at least one major surface; a sealing coating applied on the major surface of the wood substrate; and a Michael Addition curing coating layer applied on the sealing coating, wherein the sealing coating is formed by a sealing agent comprising one or more chosen from an aqueous latex of polyurethane acrylics polymer, an aqueous latex of carboxyl functional self-crosslinkable acrylics polymer, an aqueous latex of cationic acrylics polymer, an aqueous latex of polyvinyl acetate and a two-component polyurethane coating system; and wherein the Michael Addition curing coating is formed from a two-component curable coating composition. Preferably, the wood article has an adhesion of 5B or more, as measured with a cross-hatch method according to ASTM D3359.

In another aspect, the present disclosure provides a process for preparing the wood article as above, comprising (a) providing a wood substrate comprising acidic substances and having at least one major surface; (b) applying the above mentioned sealing agent on the major surface of the wood substrate to form a sealing coating; and (c) applying the above mentioned two-component curable coating composition on the sealing coating, to form a Michael Addition curing coating.

In yet another aspect, the present disclosure discloses a method for improving adhesion of a Michael Addition curing coating to a wood substrate comprising acidic substances, comprising the step of applying the above mentioned sealing agent on the major surface of the wood substrate to form a sealing coating, wherein the Michael Addition curing coating is formed from a two-component curable coating composition.

In still yet another aspect, the present disclosure discloses use of a sealing coating for improving adhesion of a Michael Addition curing coating to a wood substrate comprising acidic substances, wherein the sealing coating is formed by the above mentioned sealing agent; and wherein the Michael Addition curing coating is formed from a two-component curable coating composition.

The two-component curable coating composition in the above mentioned aspects comprises A) a film-forming resin composition, comprising a) a first reactive component having at least two acidic proton C—H in activated methylene or methine, b) a second component having at least two active unsaturated C=C group, and c) optionally additional additives comprising one or more selected from fillers, solvents, surface active additives, defoamers, dispersants, UV absorbers, open-time extenders, preservatives and fungicides; and B) a catalyst for catalyzing the Michael Addition reaction of the film-forming resin composition.

In the present disclosure, the applicant proposed an inventive new idea for the application of a Michael Addition curing coating on wood substrates containing acidic substances by applying a particular sealing agent on the surface of the wood substrates containing acidic substances to form a sealing coating. The presence of the sealing coating significantly reduces or eliminates the adverse effects of acidic substances such as tannin in the wood substrate on the Michael Addition curing coating, which has never been recognized prior to the present disclosure.

The details of one or more embodiments of the present disclosure are set forth in the description below. Other features, objects, and advantages of the present disclosure will be apparent from the description, and from the claims

Definition

As used herein, "a", "an", "the", "at least one", and "one or more" are used interchangeably. Thus, for example, a composition that comprises "an" additive can be interpreted to mean that the composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned in this invention, as along as such components or steps do not affect the basic and novel characteristics of the present disclosure, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

When used in the context of wood substrates, the term "major surface" is a surface defined by the lengthwise and widthwise dimensions of the wood substrates for providing the decoration.

As used herein, the term "sealing coating" is a continuous coating film formed of a sealing agent for block undesired substances such as tannins in a wood substrate.

As used herein, the term "adhesion" is a parameter used to measure whether a Michael addition curing coating can form an acceptable coating on a wood substrate. The higher the adhesion, the better the film-forming stability of the Michael Addition curing coating on the wood substrate is.

The term "on" when used in the context of "a coating applied on something" includes a coating being applied directly or indirectly on another coating. In some embodiments of the present disclosure, the Michael addition curing coating is applied directly to the sealing coating and is in direct contact with the sealing coating. In some embodiments of the present disclosure, one or more layers of colorant may be present between the Michael addition curing coating and the sealing coating so as to achieve the desired color.

The term "comprises", "comprising", "contains" and variations thereof do not have a limiting meaning where these terms appear in the description and claims.

The terms "preferred" and "preferably" refer to embodiments of the present disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

DETAILED DESCRIPTION

The present embodiments in one aspect provide a wood article comprising i) a wood substrate comprising acidic substances and having at least one major surface; ii) a sealing coating applied on the major surface of the wood substrate; and iii) a Michael Addition curing coating applied on the sealing coating, wherein the sealing coating is formed by a sealing agent comprising one or more chosen from an aqueous latex of polyurethane acrylics polymer, an aqueous latex of carboxyl functional self-crosslinkable acrylics polymer, an aqueous latex of cationic acrylics polymer, an aqueous latex of polyvinyl acetate and a two-component polyurethane coating system; and wherein the Michael Addition curing coatingcoating is formed from a two-component curable coating composition.

Preferably, the wood article according to the present disclosure has an adhesion of 4B or more, preferably an adhesion of 5B or more as measured with a cross-hatch method according to ASTM D3359. In an embodiment in which the Michael addition curing coating of the present disclosure has a thickness of 30 microns or more, the wood product has an adhesion of 4B or more, preferably an adhesion of 5B or higher. In an embodiment in which the thickness of the Michael addition curing coating of the present disclosure is 100 micrometers or more, the wood product has an adhesion of 4B or more, preferably an adhesion of 5B or higher. In an embodiment in which the thickness of the Michael addition curing coating of the present disclosure is 200 micrometers or more, the wood product has an adhesion of 4B or more, preferably an adhesion of 5B or higher.

Wood Substrate

As the wood substrate used to make the article of the present disclosure, any suitable wood substrate known in the art can be used. In the present disclosure, the term "wood substrate" refers to any cellulose/lignin material derived from the hard, fibrous structural organization of the stems and roots of trees or other woody plants. Wood includes, for example, hardwood and softwood wood cut directly from trees, and engineered wood composite materials made of wood strips, wood chips, wood fibers, or wood veneers. Examples of wood composite materials include, but are not limited to, plywood, oriented strand board (OSB), medium density fiberboard (MDF), particle board, and the like.

The wood article of the present disclosure comprises a wood substrate comprising an acidic substance. As an example, the acidic substance includes tannins, aldehydes and/or hemiacetals. In some embodiments of the present disclosure, the wood substrate has a tannin content of at least 0.1% by weight, preferably a tannin content of at least 1% by weight, more preferably a tannin content of at least 5% by weight, and even more preferably a tannin content of at least 10% by weight, even more preferably a tannin content of 30% by weight, as determined by CNS4716-2005. As exemplary wood substrates, hardwood, chestnut, eucalyptus, red chestnut, camellia, eucalyptus, Douglas fir, Japanese cedar, American cypress, Japanese red pine, Japanese cypress, water walnut, black walnut, maple, Japan beech, Japanese paulownia, birch, Borneo, magnolia, ash, teak, Xylosma japonicum, Catalpa wood, Dryobalanops spp., fir, oak and rubber wood may be given.

According to the present disclosure, the wood substrate has at least one, preferably two, major surfaces that are opposite one another. As used herein, "major surface" is a surface defined by the lengthwise and widthwise dimensions of the wood substrate for providing the decoration. Preferably, the major surface of the wood substrate may contain polar groups such as hydroxyl groups, amino groups, mercapto groups, and the like, so that the sealing agent of the present disclosure is easier to disperse and apply to the surface of the wood substrate. The hydroxyl groups on the surface of the wood substrate are derived from cellulose in the wood substrate, or are introduced on the surface of the wood substrate by performing surface treatment on the major surface of the wood substrate, for example, by corona treatment.

Sealing Coating

As mentioned in the background, the application of the Michael addition curing system on wood substrates is always not satisfactory in industry. Therefore, there is no wood article manufactured with this low-VOC Michael Addition curing coating system on the market. The inventor of the present disclosure inventively revealed that the acidic substance present in the wood substrate is the root cause that the adhesion of Michael addition curing coating on the wooden substrate is poor, thereby providing an inventive idea for solving the adhesion problem of the Michael addition curing coating on the wood substrate.

Therefore, in the wood article according to the present disclosure, a sealing coating is applied on the main surface of the wood substrate to seal the acidic substance such as tannin contained therein, thereby providing a wood substrate suitable for the application of a Michael addition curing coating. According to the present disclosure, the sealing coating is formed by a sealing agent comprising one or more chosen from an aqueous latex of polyurethane acrylics polymer, an aqueous latex of carboxyl functional self-crosslinkable acrylics polymer, an aqueous latex of cationic acrylics polymer, an aqueous latex of polyvinyl acetate and a two-component polyurethane coating system.

Sealing Agent i): An Aqueous Latex of Polyurethane Acrylics Polymer

In one embodiment according to the present disclosure, the sealing agent comprises an aqueous latex of polyurethane acrylics polymer (PUA). Preferably, the aqueous latex is formed by radical polymerization of acrylics monomers in the presence of an aqueous dispersion of polyurethane.

In the preparation of the aqueous latex of polyurethane acrylics polymer, any aqueous dispersion of polyurethane suitable for preparing a polyurethane acrylics polymer can be used. Optionally, an aqueous dispersion of polyurethane with ethylenically unsaturated functional groups can also be used, and the aqueous dispersion can be copolymerized with acrylic monomers added later to form a more stable aqueous latex of polyurethane acrylics polymer. According to the present disclosure, the polyurethane prepolymer having ethylenically unsaturated functional groups can be formed by any suitable preparation method using any suitable reactants. Preferably, the polyurethane functionalized with ethylenically unsaturated functional groups is formed by reaching an excess of diisocyanate with at least one polyhydroxy compound, an ethylenically unsaturated compound containing isocyanate-reactive functional groups, and optionally a polyhydroxy compound with a water dispersible group. The reaction conditions for preparing the above-mentioned unsaturated polyurethane can be easily determined by a person of ordinary skill in the art.

According to the present disclosure, the monomer used to prepare the aqueous latex of the polyurethane acrylics polymer includes any ethylenically unsaturated compound that can undergo radical polymerization. Suitably, examples of the ethylenically unsaturated compound are one or more selected from the group consisting of styrenes such as styrene, α-methylstyrene, vinyl toluene, and vinyl naphthalene, halogenated olefins such as vinyl chloride, vinylidene chloride, vinyl fluoride, tetrafluoroethylene, and hexafluoropropylene, allyl ethers such as allyl anisole, vinyl acetate, vinyl tertiary carbonate such as the commercially available vinyl tertiary carbonate VeoVa 10, acrylonitriles such as acrylonitrile and methacrylonitrile, C1-C16 alkyl ester of (meth)acrylic acid, and alkoxyalkyl ester of (meth)acrylic acid. Preferably, examples of the ethylenically unsaturated compound are one or more selected from C1-C16 alkyl esters of (meth)acrylic acid, including but not limited to methyl (meth)acrylate, ethyl (meth)acrylate, n-butyl (meth) acrylate, hexyl (meth)acrylate, decyl (meth)acrylate, and dodecyl (meth)acrylate.

The inventors of the present disclosure surprisingly discovered that the introduction of the above ethylenically unsaturated compounds resulted in the resulting aqueous dispersion of polyurethane acrylics polymer being particularly suitable for sealing acidic substances contained in wooden substrates. On the contrast, the aqueous dispersion of polyurethane alone cannot effectively seal the acidic substances contained in the wood substrate at all, which was difficult to foresee prior to the present disclosure.

According to the present disclosure, the aqueous dispersion of polyurethane acrylics polymer may be prepared by the above-mentioned method, or may be commercially available. As an example of an aqueous dispersion of polyurethane acrylics polymer, PUA1025 commercially available from Sherwin-Williams Co., Ltd. can be used.

Sealing Agent ii): An Aqueous Latex of Carboxyl Functional Self-Crosslinkable Acrylics Polymer In one embodiment according to the present disclosure, the sealing agent comprises an aqueous latex of carboxyl functional self-crosslinkable acrylics polymer. Preferably, the aqueous latex of carboxyl functional self-crosslinkable acrylics polymer has a carboxyl content of 0.1-5 wt %. According to the present disclosure, the carboxyl group content can be determined by Boehm titration, for example.

The inventors of the present disclosure surprisingly found that the above aqueous latex of carboxyl functional self-crosslinkable acrylics polymer is particularly suitable for blocking acidic substances in wood substrates. On the contrary, an aqueous latex of self-crosslinkable acrylics polymer that is not functionalized with carboxyl groups, such as DOW 3311, cannot effectively block acidic substances in wood substrates. Although the theoretical reason is unknown, the inventor believes that the self-crosslinking acrylics polymer having carboxyl functional groups is one of the important factors for its ability to effectively seal the acidic substances in the wood substrate.

According to the present disclosure, the aqueous latex of carboxyl functional self-crosslinkable acrylics polymer may be commercially available. As an example of the aqueous latex of a carboxyl functionalized self-crosslinking acrylic polymer, LP2006 SW EPS water-based self-crosslinking acrylics polymer commercially available from Sherwin-Williams can be used.

Sealing Agent iii): An Aqueous Latex of Cationic Acrylics Polymer

In one embodiment according to the present disclosure, the sealing agent comprises an aqueous latex of cationic acrylics polymer. Preferably, the aqueous latex of cationic acrylics polymer has a pH of 6.0 or less, preferably in the range of 4.2-5.2.

The inventors of the present disclosure surprisingly discovered that an aqueous latex of cationic acrylic polymers with a pH of less than 6.0 are particularly suitable for sealing acidic substances in wooden substrates, and the sealing coating formed therefrom will not bring about any adverse effect on the formation of a Michael addition curing coatings thereon, which was difficult to foresee prior to the present disclosure. Taking into account the fact that the Michael addition curing reaction is alkali-catalyzed, it is generally known that the coating composition for forming the Michael addition curing coating should not contain or touch any acidic components. However, the use of the aqueous latex of cationic acrylics polymer according to the present disclosure breaks the above-mentioned technical prejudices. According to the present disclosure, an aqueous latex of a cationic acrylic polymer with a pH of 6.0 or less, preferably between 4.2-5.2, can be used as a sealing coating, and the sealing coating formed therefrom will not produce any adverse effects on the curing of the Michael addition curing coating applied thereon, and the resulting Michael addition curing coating still exhibits excellent adhesion.

According to the present disclosure, an aqueous latex of cationic acrylics polymer having a pH of less than 6.0 may be commercially available. As an example of the aqueous latex of cationic acrylics polymer, DSM XK350 commercially available from DSM can be used.

Sealing Agent iv): An Aqueous Latex of Polyvinyl Acetate

In one embodiment according to the present disclosure, the sealing agent comprises an aqueous latex of polyvinyl acetate. Preferably, the aqueous latex of polyvinyl acetate has a pH of 6.0 or less, preferably in the range of 4.0-5.0.

The inventors of the present disclosure surprisingly discovered that an aqueous latex of polyvinyl acetate with a pH of less than 6.0 are particularly suitable for sealing acidic substances in wooden substrates, and the sealing coating formed therefrom will not bring about any adverse effect on the formation of a Michael addition curing coatings thereon, which was difficult to foresee prior to the present disclosure. Taking into account the fact that the Michael addition curing reaction is alkali-catalyzed, it is generally known that the Michael addition curing coating composition should not contain or touch any acidic components. However, the use of the aqueous latex of polyvinyl acetate according to the present disclosure breaks the above-mentioned technical prejudices. According to the present disclosure, an aqueous latex of polyvinyl acetate with a pH of 6.0 or less, preferably between 4.0-5.0, can be used as a sealing coating, and the sealing coating formed therefrom will not produce any adverse effects on the curing of the Michael addition curing coating applied thereon, and the resulting Michael addition curing coating still exhibits excellent adhesion.

According to the present disclosure, an aqueous latex of polyvinyl acetate having a pH of less than 6.0 may be commercially available. As an example of the aqueous latex of polyvinyl acetate, LS5042 commercially available can be used.

Sealing Agent v): A Two-Component Polyurethane Coating System

In one embodiment according to the present disclosure, the sealing agent comprises a two-component polyurethane coating system.

According to the present disclosure, the two-component polyurethane coating system comprises: a) a film-formation resin composition comprising an aqueous latex of active hydrogen-containing polymer; and b) a polyisocyanate hardener.

As used herein, the term, "a film-formation resin composition", refers to a resin composition which constructs the bulk of a sealing coating to be formed from the two-component polyurethane coating system, and which may comprise an aqueous latex of active hydrogen-containing polymer, and optionally additional additives including fillers.

According to the present disclosure, an aqueous latex of active hydrogen-containing polymer is used. The active hydrogen is well known for its reactivity with an isocyanate group, and may be donated by many functional groups such as —COOH, —OH, —SH, secondary amino, and primary amino. Furthermore, some functional groups, e.g., an ester group (especially a carboxylic ester group), a thioether group, or an anhydride group (especially a carboxylic anhydride group), may be converted into the functional groups capable of offering active hydrogen, e.g., through hydrolysis. Therefore, as used herein, the term, "active hydrogen-containing polymer" is intended to refer to any polymer originally containing functional groups capable of offering active hydrogen and/or any polymer containing functional groups which can be converted into any functional group capable of offering active hydrogen during the preparation and/or application of the aqueous sealing agent.

According to the present disclosure, the aqueous latex of active hydrogen-containing polymer is used to provide a resin component for the film-formation resin composition and hence the aqueous sealing agent. On the one hand, this resin component functions as a binder which provides adhesion to a substrate for the sealing coating and holds together other components, such as filler, in the film-formation resin composition to impart basic cohesive strength to the sealing coating. On the other hand, this resin component has good reactivity with the polyisocyanate hardener to achieve crosslinking of the polymeric chains, thereby forming a three dimensional network structure of the sealing coating.

The sealing coating formed by cross-linking the above resin components and polyisocyanate hardener can have the capability to block water-soluble tannins, plant oil, or other undesirable matters from migrating and bleeding out. Moreover, because of the formation of the three dimensional network structure, the sealing coating obtained from the two-component aqueous polyurethane coating system according to the present disclosure has excellent physical and chemical properties, such as nonstickiness, hardness, water resistance, solvent resistance, and duration of the sealing performance.

In a preferred embodiment of the present disclosure, the active hydrogen-containing polymer comprises one or more of vinyl acetate-ethylene copolymer, vinyl acetate-ethylene-(meth)acrylate copolymer, vinyl acetate-(meth)acrylate copolymer, polyvinyl acetate, or polyvinyl alcohol, or any combination thereof. In a particularly preferred embodiment of the present disclosure, the active hydrogen-containing polymer may be vinyl acetate-ethylene copolymer.

Preferably, the film-formation resin composition comprises the aqueous latex of active hydrogen-containing polymer in amount of about 20 to about 55% by weight, preferably about 35 to about 55% by weight, based on the total weight of the film-formation resin composition. In particular, the film-formation resin composition may comprise the aqueous latex of active hydrogen-containing polymer in amount of about 25, 30, 35, 40, 45, or 50% by weight, based on the total weight of the film-formation resin composition.

In a preferred embodiment of the present disclosure, the aqueous latex of active hydrogen-containing polymer has a solid content in the range of about 20% to about 60%, preferably about 45% to about 60%, wherein the solid content is calculated as the percentage of the weight of the active hydrogen-containing polymer relative to the total weight of the active hydrogen-containing polymer plus water. In particular, the aqueous latex of active hydrogen-containing polymer has a solid content of about 22.5, 25.0, 27.5, 30.0, 32.5, 35.0, 37.5, 40.0, 42.5, 45.0, 47.5, 50.0, 52.5, 55.0, or 57.5%. In an embodiment of the present disclosure, the aqueous latex of active hydrogen-containing polymer has a pH value in the range of about 4.2 to about 8.0.

As disclosed above, the aqueous latex of active hydrogen-containing polymer can be prepared by a suitable emulsion polymerization process which is well known to a person skilled in the art. Alternatively, as an example of the aqueous latex of active hydrogen-containing polymer, any suitable commercially available product may be used, such as Vinnapas® 402 from Wacker Chemie A G, Germany and Celvolit® 1602 from Celanese Corporation, US.

As used herein, the term, "a polyisocyanate hardener", is intended to refer to a polyisocyanate compound, an isocyanate prepolymer, or a combination thereof. The polyisocyanate hardener has two or more isocyanate functionalities, and is capable of reacting with the active hydrogen-containing polymer to achieve chain extension and crosslinking, thereby allowing the three-dimensional network structure to be formed in the sealing coating.

Suitable polyisocyanate hardeners include aliphatic polyisocyanates, aromatic polyisocyanates, or any combination thereof. As used herein, the term, "aliphatic polyisocyanates", is intended to refer to any polyisocyanate compound having isocyanate groups directly attached to an aliphatic chain or ring. As used herein, the term, "aromatic polyisocyanates", is intended to refer to any polyisocyanate compound having isocyanate groups directly attached to an aromatic ring.

As examples of suitable polyisocyanate compounds, hexamethylene diisocyanate, dodecamethylene diisocyanate, cyclohexene-1,4-diisocyanate, 4,4'-dicyclohexene methane diisocyanate, cyclopentene-1,3-diisocyanate, p-phenylene diisocyanate, toluene-2,4-diisocyanate, naphthalene-1,4-diisocyanate, diphenyl-4,4'-diisocyanate, benzene-1,2,4-triisocyanate, xylylene-1,4-diisocyanate, xylylene-1,3-diisocyanate, diphenylene methane diisocyanate, butane-1,2,3-triisocyanate, or polymethylene polyphenyl isocyanate can be used.

As examples of suitable isocyanate prepolymer, polyurethane based prepolymer of any of the polyisocyanate compounds as given above, polyester based prepolymer of any of the polyisocyanate compounds as given above, and polyether based prepolymer of any of the polyisocyanate compounds as given above can be used. The polyurethane based prepolymer, the polyester based prepolymer or the polyether based prepolymer may be prepare by any suitable method well known to a person skilled in the art. For example, the polyurethane based prepolymer may be prepared by reacting a polyol with one or more of the polyisocyanate compounds under suitable conditions; the polyester based prepolymer or the polyether based prepolymer may be prepared by reacting polyester polyol or polyether polyol with one or more of the polyisocyanate compounds under suitable conditions. Alternatively, as the polyurethane based prepolymer, the polyester based prepolymer or the polyether based prepolymer, any suitable commercial available product can be used, for example, BAYTEC® ME 120 or BAYTEC® ME 230 from Bayer, Germany.

In a preferred embodiment of the present disclosure, the polyisocyanate hardener may be diphenyl methane diisocyanate, polymethylene polyphenyl polyisocyanate, polyester based diphenyl methane diisocyanate prepolymer, polyether based diphenyl methane diisocyanate prepolymer, or any combination thereof. In a further preferred embodiment of the present disclosure, polymethylene polyphenyl isocyanate, polyether based diphenyl methane diisocyanate prepolymer or polyester based diphenyl methane diisocyanate prepolymer is used.

According to the present disclosure, the weight ratio of the polyisocyanate hardener to the film-formation resin composition is within the range of 3:100 to 10:100. In general, when the weight ratio of the polyisocyanate hardener to the film-formation resin composition is less than 3:100, then the sealing performance of the resulting sealing coating is limited so as to fail to achieve insufficient sealing effect. In general, when the weight ratio of the polyisocyanate hardener to the film-formation resin composition is greater than 20:100, then the operability of the sealing system and/or the mechanical properties of the resulting sealing coating may be degraded.

According to the present disclosure, the above-mentioned sealing agents i), ii), iii), iv) and v) can be combined in any manner so as to form a sealing agent suitable for coating the surface of a wood substrate. For example, the sealing agents i) and ii) may be combined, the sealing agents i) and iii) may be combined, the sealing agents i) and v) may be combined, and the sealing agents i), ii) and iii) may be combined.

According to the present disclosure, the above sealing agent may optionally include additional additives for a sealing agent which do not adversely affect the sealing agent or a resultant sealing coating obtained therefrom. Suitable additives include, for example, those that improve the processability or manufacturability of the sealing agent, or improve a particular functional property or characteristic of the sealing agent or the sealing coating formed therefrom, such as adhesion to a substrate. Additives that may be included are, for example, one or more selected from carriers, such as water, emulsifiers, pigments, fillers, anti-migration aids, antifungal agents, preservatives, chain extenders, lubricants, wetting agents, biocides, plasticizers, defoamers, colorants, waxes, anti-oxidizer, dispersant, adhesion promoter, UV stabilizer, thickener, defoamer, pH adjuster, or a combination thereof. Each optional ingredient can be included in a sufficient amount to serve its intended purpose, but preferably not in such an amount to adversely affect the sealing agent or the sealing coating obtained therefrom.

According to the present disclosure, the sealing agent can be applied in a variety of ways that are familiar to those skilled in the art. The application method includes dip coating, spin coating, spray coating, curtain coating, brush coating, roll coating, and other coating methods known in the art. In one embodiment of the present disclosure, application is performed using a spraying process. The sealing agent can be applied in various sealing coating thickness. In an embodiment of the present disclosure, the sealing agent is applied in such a sealing coating thickness in the range of about 5 to about 100 μm, preferably in the range of about 20 to 80 μm. The applied coating may be dried by air drying or by accelerating drying with various drying devices e.g., ovens that are familiar to those skilled in the art.

Michael Addition Curing Coating

In the wood article according to the present disclosure, a Michael addition curing coating may be formed on the surface of the wood substrate treated by the sealing agent. The Michael addition curing coating can be directly applied to the sealing coating and in direct contact with the sealing coating. Alternatively, there may be one or more colorant layers between the Michael addition curing coating and the sealing coating, so as to obtain the desired color.

The Michael addition curing coating thus formed shows very excellent adhesion to the wood substrate. Preferably, the wood article according to the present disclosure has an adhesion of 5B or more, as measured with a cross-hatch method according to ASTM D3359. In an embodiment in which the Michael addition curing coating of the present disclosure has a thickness of 30 microns or more, the wood product has an adhesion of 5B or higher. In an embodiment in which the thickness of the Michael addition curing coating of the present disclosure is 100 micrometers or more, the wood product has an adhesion of 5B or higher. In an embodiment in which the thickness of the Michael addition curing coating of the present disclosure is 200 micrometers or more, the wood product has an adhesion of 5B or higher.

According to the present disclosure, the Michael Addition curing coating is formed from a two-component curable coating composition comprising,
A) a film-forming resin composition, comprising a) a first reactive component having at least two acid proton C—H in activated methylene or methine, b) a second component having at least two active unsaturated C=C group, and c) optionally additional additives comprising one or more selected from fillers, solvents, surface active additives, defoamers, dispersants, UV absorbers, open-time extenders, preservatives and fungicides; and
B) a catalyst for catalyzing the Michael Addition reaction of the film-forming resin composition.

The film-forming resin composition, the catalyst and the preparation process of the Michael addition curing coating are described in detail in U.S. Pat. Nos. 5,084,536, 5,565, 525, EP2556108 and EP2764035. Unless otherwise stated, the contents described in the above patent applications are incorporated herein by reference and are applicable herein.

According to an embodiment of the present disclosure, the first reactive component has a malonate or acetoacetate functional group as a first reactive functional group and preferably has a malonate functional group. Preferably, the first reactive component mainly contains one type of first reactive functional group, preferably greater than 50, 75, 90 and most preferably 100% of the first reactive functional group is one type of first reactive functional group, preferably malonate or acetoacetate, most preferably malonate. According to the present disclosure, the second reactive component has an acryl group as a second reactive functional group.

The first reactive functional group and the second reactive functional group in the first reactive component and the second reactive component are preferably incorporated into the backbone of polymer or suspended on the pendent chain or terminal of polymer. Preferably, the first reactive component and the second reactive component are polyester, alkyd, polyurethane, polyacrylate, epoxy resin, polyamide and polyvinyl resin having a first reactive functional group and a second reactive functional group in its backbone, pendent chain, terminal or a combination thereof, respectively.

The first reactive component and the second reactive component may be monomeric, but at least one, preferably at least two reactive components are polymers having a weight average molecular weight (Mw) of at least 250 g/mol, preferably polymers having a weight average molecular weight (Mw) between 250 and 5000 or 300 and 5000, more preferably between 400 and 4000 or between 500 and 3000 g/mol, the weight average molecular weight being measured by GPC.

The relative amounts of the first reactive component and the second reactive component are selected so that the molar ratio of the activated unsaturated reactive group C=C in the second reactive component to the activated acidic reactive group C—H in the first reactive component is between 0.5 and 2, and preferably between 0.75 and 1.5, more preferably between 0.8 and 1.2.

The first reactive component and the second reactive component are both commercially available, for example Acure 510-170 commercially available from Allnex resin with a solid content of 85% as the first reactive component, and Acure 550-100 commercially available from Allnex resin with a solid content of 85% as the second reactive component.

In the two-component curable coating composition according to the present disclosure, the film-forming resin composition may optionally comprise one or more fillers. As used herein, the term, "filler", is intended to refer to any coating volume extender, either organic or inorganic, in the form of e.g., particles or powders. There is no particular limitation on the shape of particles, and the filler may have any suitable shape. The particle size of the filler may vary over a broad range, e.g., from about 10 nanometers to about 50 micrometers. In addition to serving as a coating volume extender, some fillers may impart one or more desired properties to the composition and/or coating resulted from the composition. For example, some fillers may impart desired color to the composition and hence the coating resulted from the composition, and in this case such fillers may be also referred to as "pigment". Some fillers may improve chemical and/or physical properties, in particular mechanical properties of the coating resulted from the composition, and in this case they may also be referred to as "enforcing additive".

In the two-component curable coating composition according to the present disclosure, the film-forming resin composition may further comprises additional additives commonly used in aqueous epoxy resin primers, and these additives will not adversely affect the coating composition or the cured coating obtained therefrom. Suitable additives include, for example, those that can be used to improve the processability or manufacturability of the composition, enhance composition aesthetics, or improve a particular functional property or characteristic of the coating composition or the cured composition resulting therefrom, such as adhesion to a substrate. Suitable examples of the additive include, such as solvents, surface active additives, defoamers, dispersants, UV absorbers, open-time extenders, preservatives and fungicides. Each optional ingredient can be included in a sufficient amount to serve its intended purpose, but preferably not in such an amount to adversely affect the coating composition or the cured coating resulting therefrom.

In the two-component curable coating composition according to the present disclosure, the catalyst may be a non-latent catalyst or a latent catalyst. Among them, the latent catalyst may be a carbon dioxide-blocked strong base catalyst, preferably a dialkyl or quaternary ammonium alkyl carbonate as described in EP2556108. Since the catalyst generates carbon dioxide, it is preferably used in coatings with a thickness of 500, 400, 300, 200, or 150 microns.

EP0326723 describes a homogeneous base catalyst that is more suitable for thicker coatings, which is a catalyst composed of a combination of tertiary amine and epoxide. A preferred homogeneous catalyst is a salt of a basic anion X− from an acidic X—H group containing compound wherein X is N, P, O, S or C, in which the anion X− is a Michael Addition donor reactable with a second reactive component and the anion X− is characterized by a pKa of the corresponding acid X—H of more than two units lower than the pKa of the majority first active component and being lower than 10.5. The details of the catalyst are described in PCT/EP2014/056953, which is incorporated herein by reference.

Preferably, according to the present disclosure, the weight ratio of the catalyst to the film-forming resin composition can be varied in the range of 2:100 to 8:100. Generally speaking, in the event that the weight ratio of the catalyst to the film-forming resin composition is less than 2:100, the resulting coating has a poor curing performance. While in the event that the weight ratio of the catalyst to the film-forming resin composition is greater than 8:100, the operating performance of the resulting Michael addition curing coating and/or the mechanical properties of the resulting coating may be reduced. According to actual needs, an additional inert diluent can be added during the preparation of the catalyst and/or film-forming resin composition, without affecting the reactivity of the above catalyst and film-forming resin composition so as to reduce the viscosity of components, for example. Therefore, the weight ratio of the catalyst to the film-forming resin composition is not limited to the above range, and can be adjusted according to actual needs.

According to the present disclosure, the two-component curable coating composition may be prepared by simply mixing the film-forming resin composition with the catalyst in a mixing device at a predetermined weight ratio, prior to application. The mixed curable coating composition can be applied in a variety of ways that are familiar to those skilled in the art, including spraying (e.g., air assisted, airless or electrostatic spraying), brushing, rolling, flooding and dipping. In an embodiment of the present disclosure, the mixed curable coating composition is coated by spraying. The curable coating composition can be applied in various wet film thickness. In an embodiment of the present disclosure, the curable coating composition is applied in such a wet film thickness in the range of about 2 to about 260 µm, preferably in the range of about 30 to 260 µm. The applied coating may be cured by air drying at room temperature or by accelerating drying with various drying devices e.g., ovens that are familiar to those skilled in the art.

According to the present disclosure, the wood article can be prepared, for example, by the following steps: (1) providing a polished wood substrate; (2) applying the sealing agent according to the present disclosure to the wood substrate with spraying, thereby forming a sealingcoating; and (3) with a wet on dry process, applying one or more Michael Addition curing coating on the sealing coating. Optionally, a colorant may be coated on the sealing coating prior to step (3), so as to provide the wood substrate with the desired color.

According to the present disclosure, the wood articles thus obtained can be used for the following applications, including, but not limited to: household furniture, such as tables, chairs, cabinets, and the like; bedroom and bathroom furniture; office furniture; custom furniture, such as school and children's furniture, hospitals furniture, restaurant and hotel furniture, kitchen cabinets and furniture; panels for interior design; indoor and outdoor windows and doors; indoor and outdoor window and door frames; outdoor and indoor wall panels and wooden floors.

In yet another aspect, the present disclosure discloses a method for improving adhesion of a Michael Addition curing coating to a wood substrate comprising acidic substances, comprising the step of applying a sealing coating on the major surface of the wood substrate wherein the sealing coating is formed by a sealing agent comprising one or more chosen from an aqueous latex of polyurethane acrylics polymer, an aqueous latex of carboxyl functional self-crosslinkable acrylics polymer, an aqueous latex of cationic acrylics polymer, an aqueous latex of polyvinyl acetate and a two-component polyurethane coating system; and wherein the Michael Addition curing coating is formed from a two-component curable coating composition comprising
 A) a film-forming resin composition, comprising a) a first reactive component having at least two acidic proton C—H in activated methylene or methine, b) a second component having at least two active unsaturated C═C group, and c) optionally additional additives comprising one or more selected from fillers, solvents, surface active additives, defoamers, dispersants, UV absorbers, open-time extenders, preservatives and fungicides; and
 B) a catalyst for catalyzing the Michael Addition reaction of the film-forming resin composition.

In still yet another aspect, the present disclosure discloses use of a sealing coating for improving adhesion of a Michael Addition curing coating to a wood substrate comprising acidic substances, wherein the sealing coating is formed by a sealing agent comprising one or more chosen from an aqueous latex of polyurethane acrylics polymer, an aqueous latex of carboxyl functional self-crosslinkable acrylics polymer, an aqueous latex of cationic acrylics polymer, an aqueous latex of polyvinyl acetate and a two-component polyurethane coating system; and wherein the Michael Addition curing coating is formed from a two-component curable coating composition comprising
 A) a film-forming resin composition, comprising a) a first reactive component having at least two acidic proton C—H in activated methylene or methine, b) a second component having at least two active unsaturated C═C group, and c) optionally additional additives comprising one or more selected from fillers, solvents, surface active additives, defoamers, dispersants, UV absorbers, open-time extenders, preservatives and fungicides; and
 B) a catalyst for catalyzing the Michael Addition reaction of the film-forming resin composition.

The above mentioned sealing coating can be applied on various wood substrates containing acidic substances, which solves the problem that the Michael addition curable coating is difficult to adhere to the wood substrates. The wood articles thus treated can be used for the following applications, including, but not limited to: household furniture, such as tables, chairs, cabinets, and the like; bedroom and bathroom furniture; office furniture; custom furniture, such as school and children's furniture, hospitals furniture, restaurant and hotel furniture, kitchen cabinets and furniture; panels for interior design; indoor and outdoor windows and doors; indoor and outdoor window and door frames; outdoor and indoor wall panels and wooden floors.

The following examples describe the present disclosure in more detail, which are for illustrative purposes only, since various modifications and changes will be apparent to those skilled in the art from the scope of the present disclosure. Unless otherwise indicated, all parts, percentages, and ratios reported in the following examples are on a weight basis and all reagents used in the examples are commercially available and may be used without further treatment.

EXAMPLES

Example 1

Treatment of Wood Substrates

Solid wood boards commercial available from the timber market were dried. A sample of size 15 cm*15 cm*1.5 cm was taken from the dried board and conditioned at a temperature of 25° C. and a relative humidity (RH) of 60% with an air flow rate of 1.8 m/s to constant, where the equilibrium moisture content of the sample was 11%. A strip sander was used to polish the sample by using a sandpaper purchased from 3M$^T$ Utility Cloth Sheet 240 and then the polished sample was cleaned with a pressure gun for further use.

Formation of a Sealing Coating

Various sealing agents were sprayed on the treated sample to form a sealing coating, and dried at air for 1 hour, in an oven at 70° C. for 1 hour, and at air for 7 days.

Formation of Michael Addition Curing Coating

The components of part A were mixed in the amounts shown in Table 1 below to form part A. And then Part A, Part B and an appropriate amount of diluent were mixed in the amounts shown in Table 2 below to form a two-component coating composition as a Michael addition curable coating composition.

TABLE 1

| | Weight parts | | |
|---|---|---|---|
| Part A | Clear vanish | White paint | Function |
| Acure 510-170 (85% solid content) | 597.0 | 597.0 | Malonic acid functional resin |
| Acure 550-100 (85% solid content) | 279.1 | 279.1 | Acrylic functional resin |
| Tinuvin 292 | 8.0 | 8.0 | UV absorber |
| BYK-3550 | 2.0 | 2.0 | Surfactant |
| BYK-A530 | 2.0 | 2.0 | Defoamer |
| BYK-2150 | — | 10 | Dispersant |
| TiO$_2$ | — | 250 | Pigments and fillers |
| Butyl acetate | 45.5 | 45.5 | Solvent |
| isopropanol | 14.1 | 14.1 | Solvent |
| 1,2,4-trizaole solution (10% in isopropanol) | 54.3 | 54.3 | Open-time extender |
| total | 1002 | 1262 | |
| Part B: Acure 500 | 42.3 | | catalyst |

TABLE 2

| Coating composition | Solid content % | VOC (g/L) | viscosity (s) (Iwata cup NK-2 @ 25° C.) |
|---|---|---|---|
| Clear vanish: Part A/Part B/diluent | 75 | 259 | 20.13 |
| White paint: | 83 | 204 | 18.56 |

TABLE 2-continued

| Coating composition | Solid content % | VOC (g/L) | viscosity (s) (Iwata cup NK-2 @ 25° C.) |
|---|---|---|---|
| Part A/part B/diluent diluent: BAC/MAK/NBA = 40/30/30 | | | |

Then, the formed coating compositions were sprayed on the wood substrate treated with different sealing coating, and then measured for its adhesion, shown in Table 3.

TABLE 3

| Item | Sealing agent | Description | Adhesion |
|---|---|---|---|
| 1 | WB 2K PU | Aqueous two-component polyurethane coating system | 5B |
| 2 | SB 2K PU | Solvent-borne two-component polyurethane coating system | 2B |
| 3 | PUA 1025 SW | Aqueous latex of polyurethane acrylics polymer | 5B |
| 4 | WQ1151B | Aqueous latex of polyurethane polymer | 0B |
| 5 | LP 2006 SW | Aqueous latex of carboxyl functionalized self-crosslinking acrylics polymer | 5B |
| 6 | Dow 3311 | Aqueous latex of self-crosslinking acrylics polymer | 0B |
| 7 | DSM XK350 | Aqueous latex of cationic acrylic polymer, pH 4.2-5.2 | 5B |
| 8 | LS 5042 | Aqueous latex of polyvinyl acetate, pH 4.0-5.0 | 4B |

It can be seen from the above result that the adhesion of the Michael addition curing coating to the wood substrate containing acidic substance, such as tannin was specifically improved by the sealing coating formed from the aqueous latex of polyurethane acrylics polymer, the aqueous latex of carboxyl functional self-crosslinkable acrylics polymer, the aqueous latex of cationic acrylics polymer, the aqueous latex of polyvinyl acetate and the two-component polyurethane coating system according to the present disclosure.

Example 2

In order to study the reason for the poor adhesion of the Michael addition curing coating on the wood substrate, the inventors carried out the following verification test. First, aqueous tannin solutions were formulated with concentrations of 0%, 1%, 5%, 10%, and 15%. Then, each aqueous tannin solution was sprayed on the pine wood samples, and dried in the air for 30 minutes and in a 50-50 oven for 2 hours, and then cooled.

Then, the clear varnish formulated in the above Example 1 for forming the Michael addition curing coating was coated on the treated wood with a wet film thickness of 120 microns, and dried in the air for 4 days, for further test. The test results are summarized in Table 4 below.

TABLE 4

| samples | Adhesion | Drying time (min) | Pencil hardness |
|---|---|---|---|
| Sample with 0% tannin solution | 4B | 35 | B |
| Sample with 1% tannin solution | 4B | 40 | 2B |
| Sample with 5% tannin solution | 2B | 51 | 2B |

TABLE 4-continued

| samples | Adhesion | Drying time (min) | Pencil hardness |
|---|---|---|---|
| Sample with 10% tannin solution | 0B | 81 | 2B |
| Sample with 15% tannin solution | 0B | 90 | 2B |

From the results in Table 4 above, it can be seen that the tannin in the wood substrate will negatively affect the adhesion of the Michael addition curing coating, resulting in a significant decrease of cross-hatch adhesion and an extended drying time. Prior to the present disclosure, there is no prior art to discover that the presence of tannin in the wood substrate is the root cause for the adhesion problem of the Michael addition curing coating on the wood substrate.

While the present disclosure has been described with respect to a number of embodiments and examples, those skilled in the art, having benefit of this invention, will appreciate that other embodiments can be devised which do not depart from the scope and spirit of the present disclosure as disclosed herein.

What is claimed is:

1. A wood article comprising:
    a wood substrate comprising acidic substances and having at least one major surface;
    a sealing coating applied on the major surface of the wood substrate; and
    a Michael Addition curing coating applied on the sealing coating, wherein the sealing coating is formed by a sealing agent comprising one or more chosen from an aqueous latex of polyurethane acrylics polymer, an aqueous latex of carboxyl functional self-crosslinkable acrylics polymer, an aqueous latex of cationic acrylics polymer, an aqueous latex of polyvinyl acetate, or a two-component polyurethane coating system; and
    wherein the Michael Addition curing coating is formed from a two-component curable coating composition.

2. The article as claimed in claim 1, wherein the aqueous latex of polyurethane acrylics polymer is formed by radical polymerization of acrylics monomers in the presence of an aqueous dispersion of polyurethane.

3. The wood article as claimed in claim 1, wherein the aqueous latex of carboxyl functional self-crosslinkable acrylics polymer has a carboxyl content of 0.1-5 wt %.

4. The wood article as claimed in claim 1, wherein the aqueous latex of cationic acrylics polymer has a pH of 6.0 or less.

5. The wood article as claimed in claim 1, wherein the aqueous latex of polyvinyl acetate has a pH of 6.0 or less.

6. The wood article as claimed in claim 1, wherein the sealing coating has a thickness in the range of 5-100 μm.

7. The wood article as claimed in claim 1, wherein the acidic substances comprise tannin, and the wood substrate has a tannin content of at least 0.1 wt % as measured according to CNS4716-2005.

8. The wood article as claimed in claim 1, wherein the wood substrate is one or more chosen from hardwood, chestnut, *eucalyptus*, red chestnut, *camellia*, pressing wood, Douglas fir, Japanese cedar, American cypress, Japanese red pine, Japanese cypress, water walnut, black walnut, maple, Japan beech, Japanese *paulownia*, birch, Borneo, *magnolia*, ash, teak, Xylosma *japonicum, Catalpa* wood, Dryobalanops spp., fir, walnut, oak, or rubber wood.

9. The wood article as claimed in claim 1, wherein the two-component curable coating composition comprises:
    A) a film-forming resin composition, comprising a) a first reactive component having at least two acid proton C—H in activated methylene or methine, b) a second component having at least two active unsaturated C=C group, and c) optionally additional additives comprising one or more chosen from fillers, solvents, surface active additives, defoamers, dispersants, UV absorbers, open-time extenders, preservatives, or fungicides; and
    B) a catalyst for catalyzing the Michael Addition reaction of the film-forming resin composition.

10. The wood article as claimed in claim 9, wherein the weight ratio of the film-forming resin composition to the catalyst ranges from 100:2 to 100:8.

11. The wood article as claimed in claim 1, wherein the Michael Addition curing coating has a thickness of 30 μm or more.

12. The wood article as claimed in claim 1, wherein the article has an adhesion of 4B or more, as measured with a cross-hatch method according to ASTM D3359.

* * * * *